Aug. 18, 1964　　A. J. STANTON ETAL　　3,144,810
AUTOMATIC FEED AND CONTROL MECHANISM
Filed June 3, 1957　　　　　　　　　　　　13 Sheets-Sheet 1

INVENTORS
ARTHUR J. STANTON
DAVID F. ANDERSON
RICHARD E. TAYLOR
ROBERT BUTTERWORTH
RUSSELL T. SHAWEN

BY

ATTORNEYS

INVENTORS
ARTHUR J. STANTON
DAVID F. ANDERSON
RICHARD E. TAYLOR
ROBERT BUTTERWORTH
RUSSELL T. SHAWEN

BY
ATTORNEYS

INVENTORS
ARTHUR J. STANTON
DAVID F. ANDERSON
RICHARD E. TAYLOR
ROBERT BUTTERWORTH
RUSSELL T. SHAWEN

ATTORNEYS

INVENTORS
ARTHUR J. STANTON
DAVID F. ANDERSON
RICHARD E. TAYLOR
ROBERT BUTTERWORTH
RUSSELL T. SWAWEN

BY
ATTORNEYS

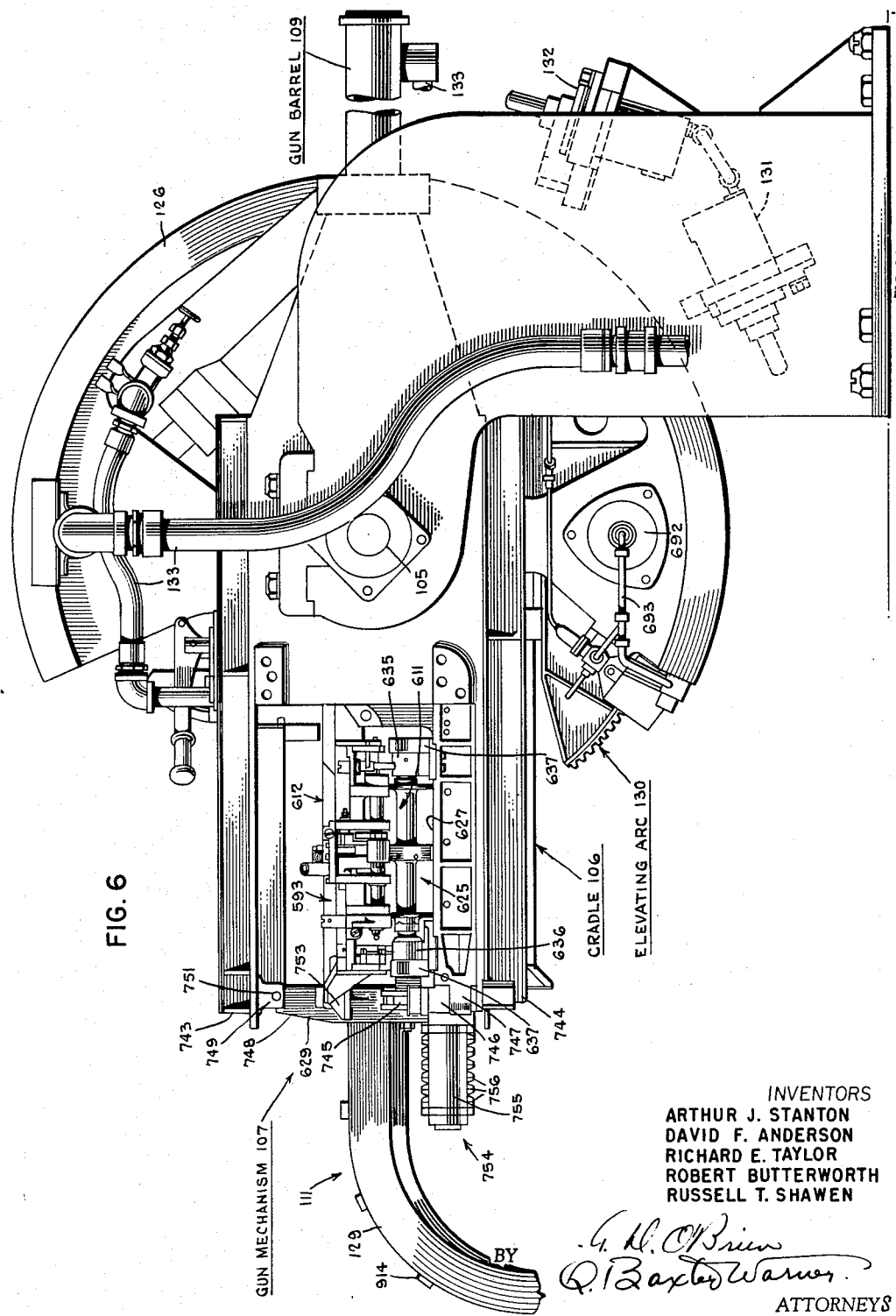

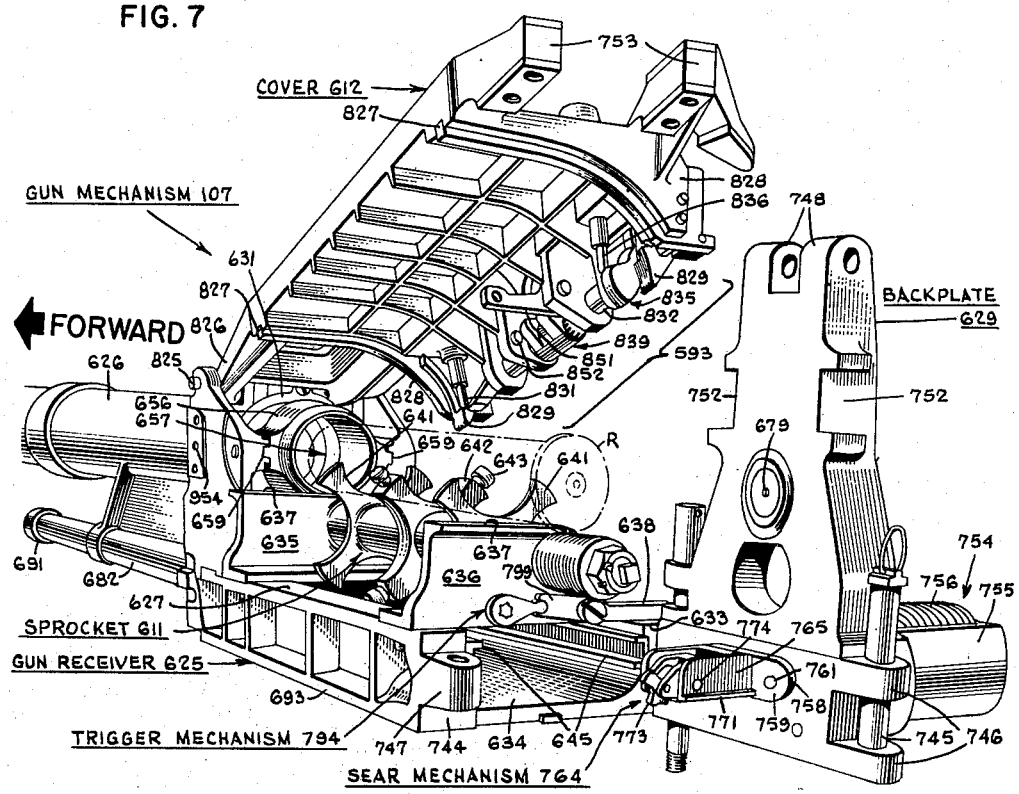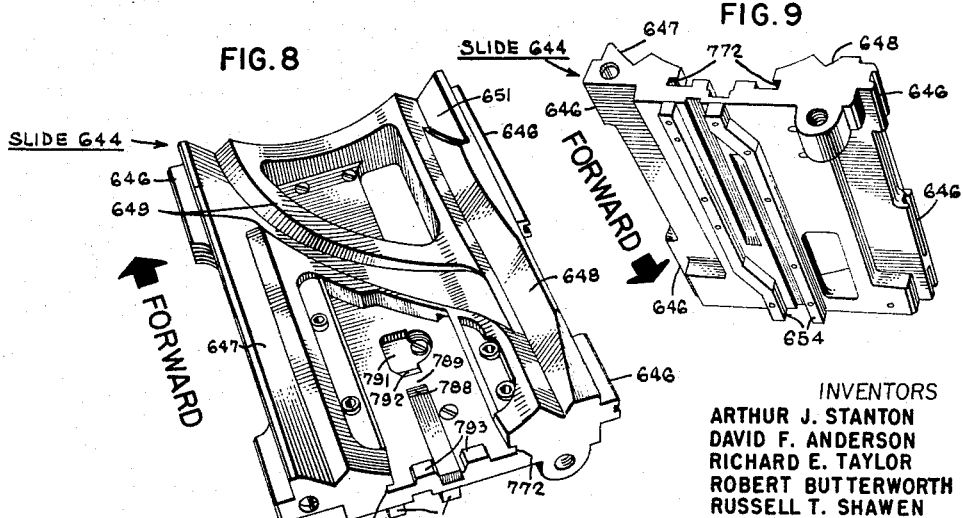

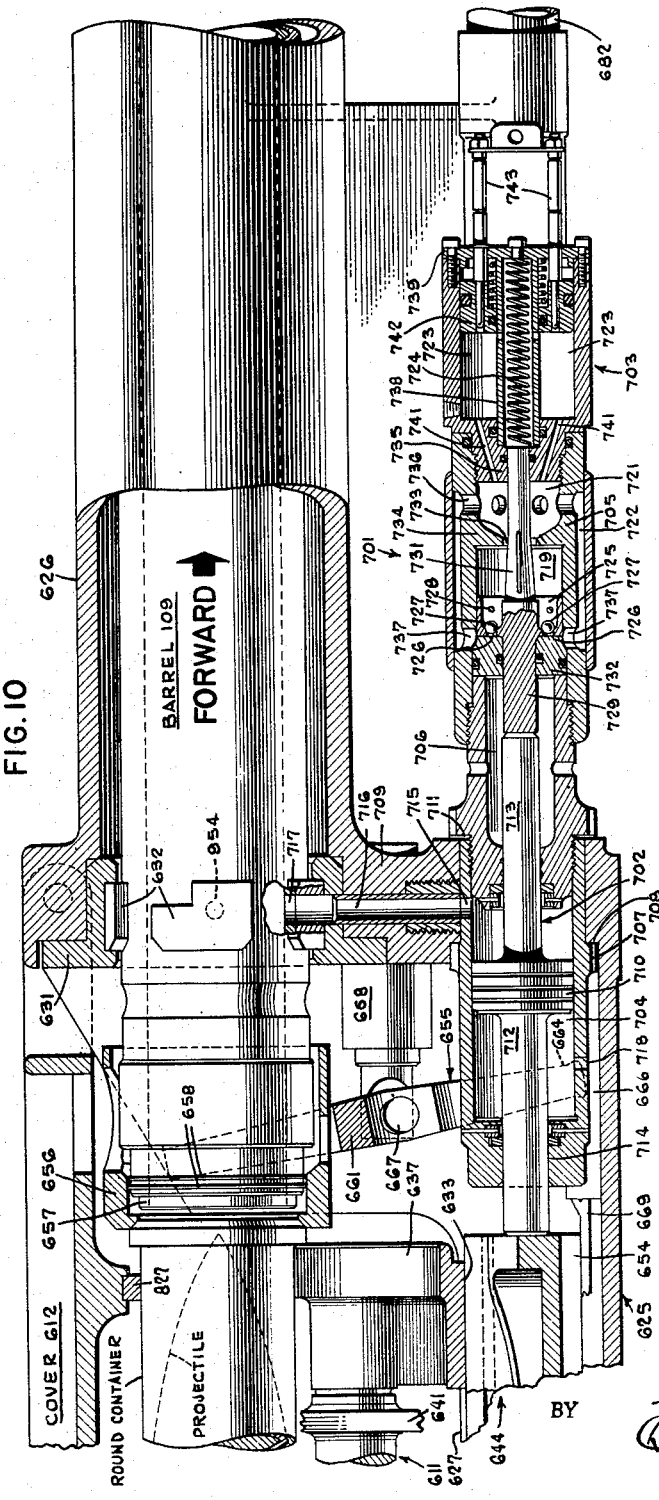

Aug. 18, 1964     A. J. STANTON ETAL     3,144,810
AUTOMATIC FEED AND CONTROL MECHANISM
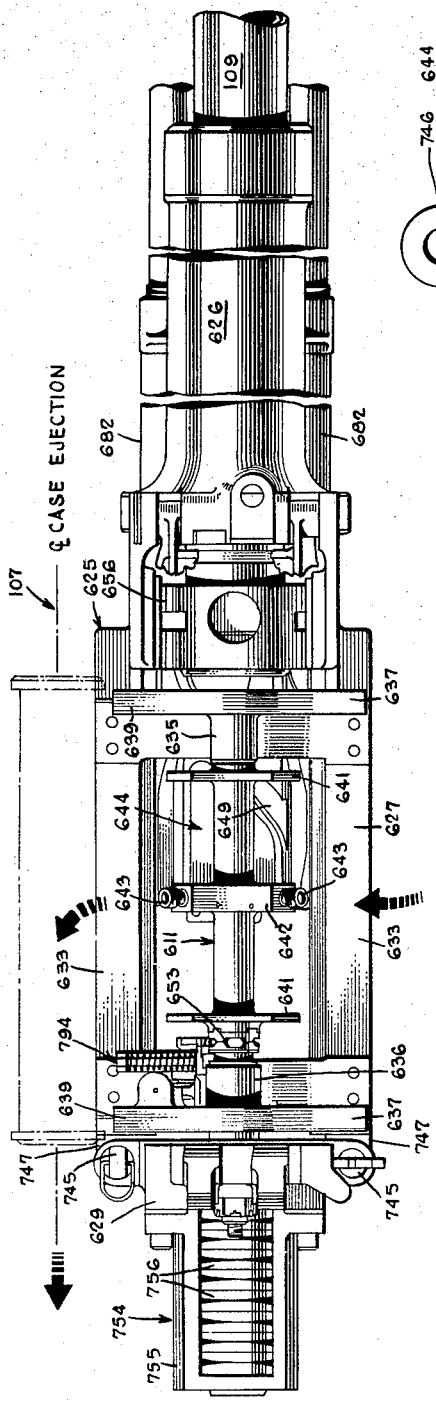
INVENTORS
ARTHUR J. STANTON
DAVID F. ANDERSON
RICHARD E. TAYLOR
ROBERT BUTTERWORTH
RUSSELL T. SHAWEN
BY
ATTORNEYS Aug. 18, 1964  A. J. STANTON ETAL  3,144,810
AUTOMATIC FEED AND CONTROL MECHANISM
Filed June 3, 1957  13 Sheets-Sheet 10
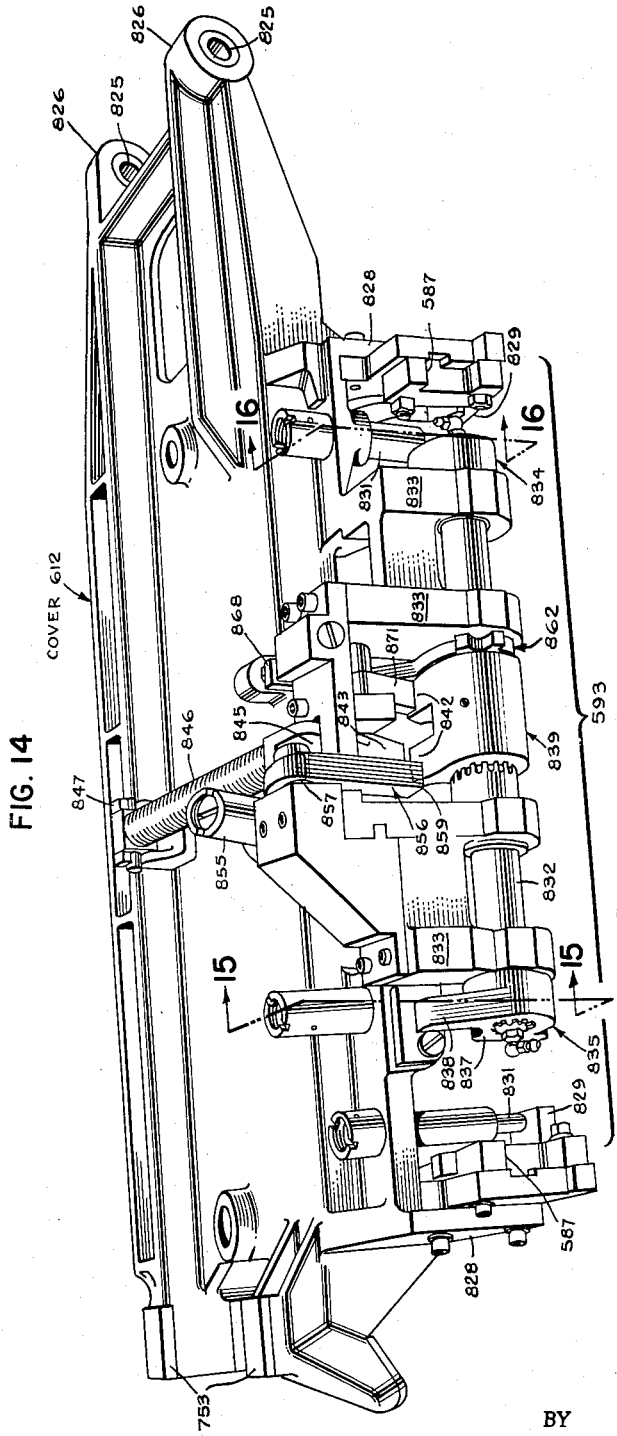
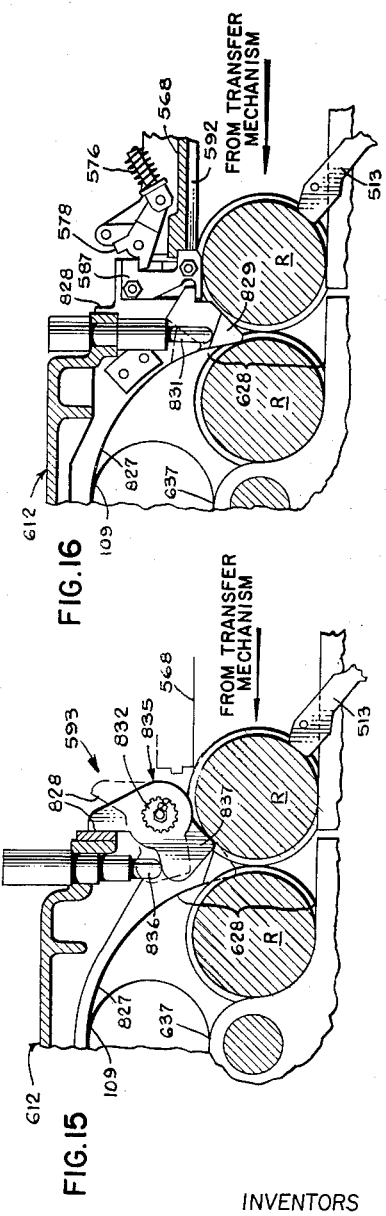
INVENTORS
ARTHUR J. STANTON
DAVID F. ANDERSON
RICHARD E. TAYLOR
ROBERT BUTTERWORTH
RUSSELL T. SHAWEN
BY
ATTORNEYS

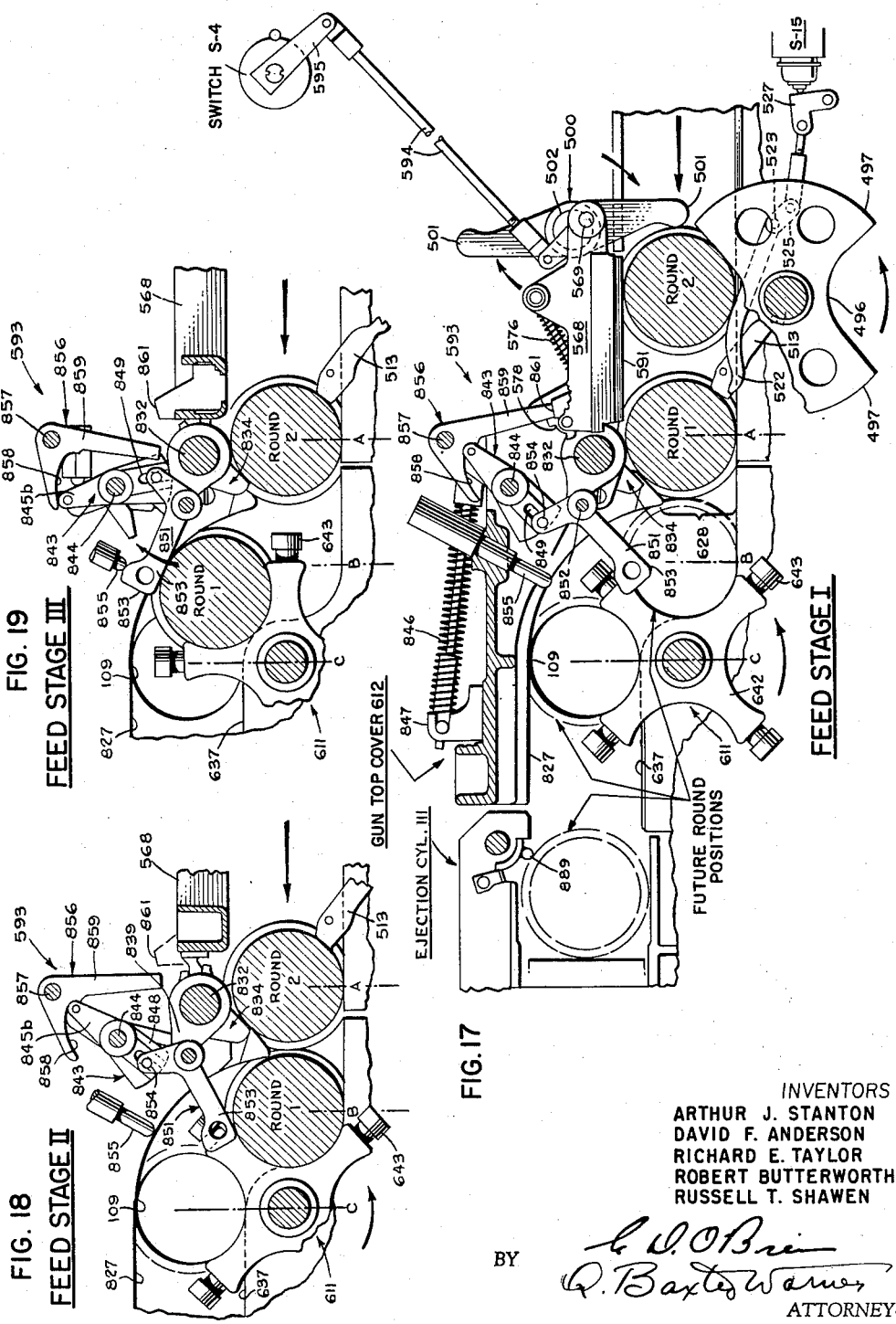

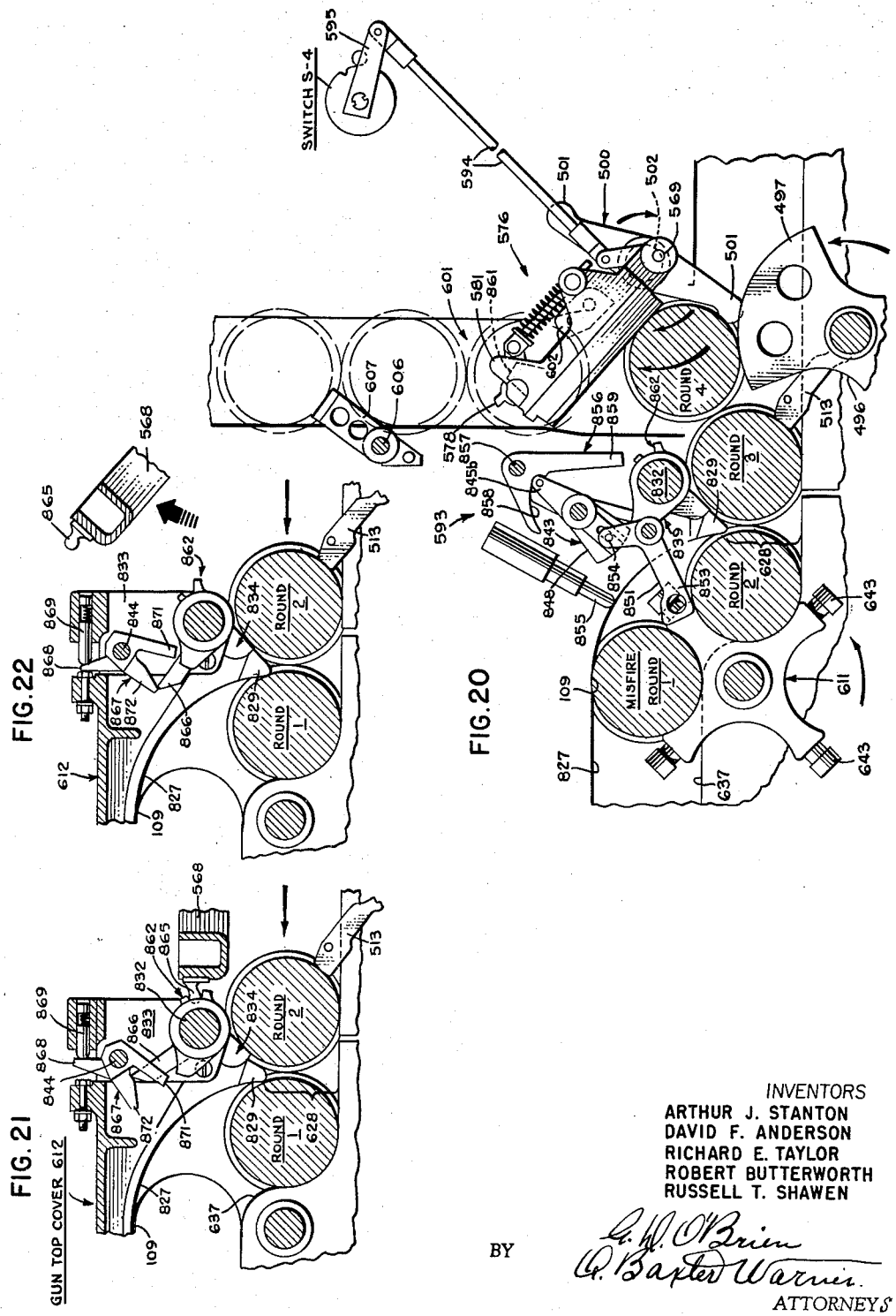

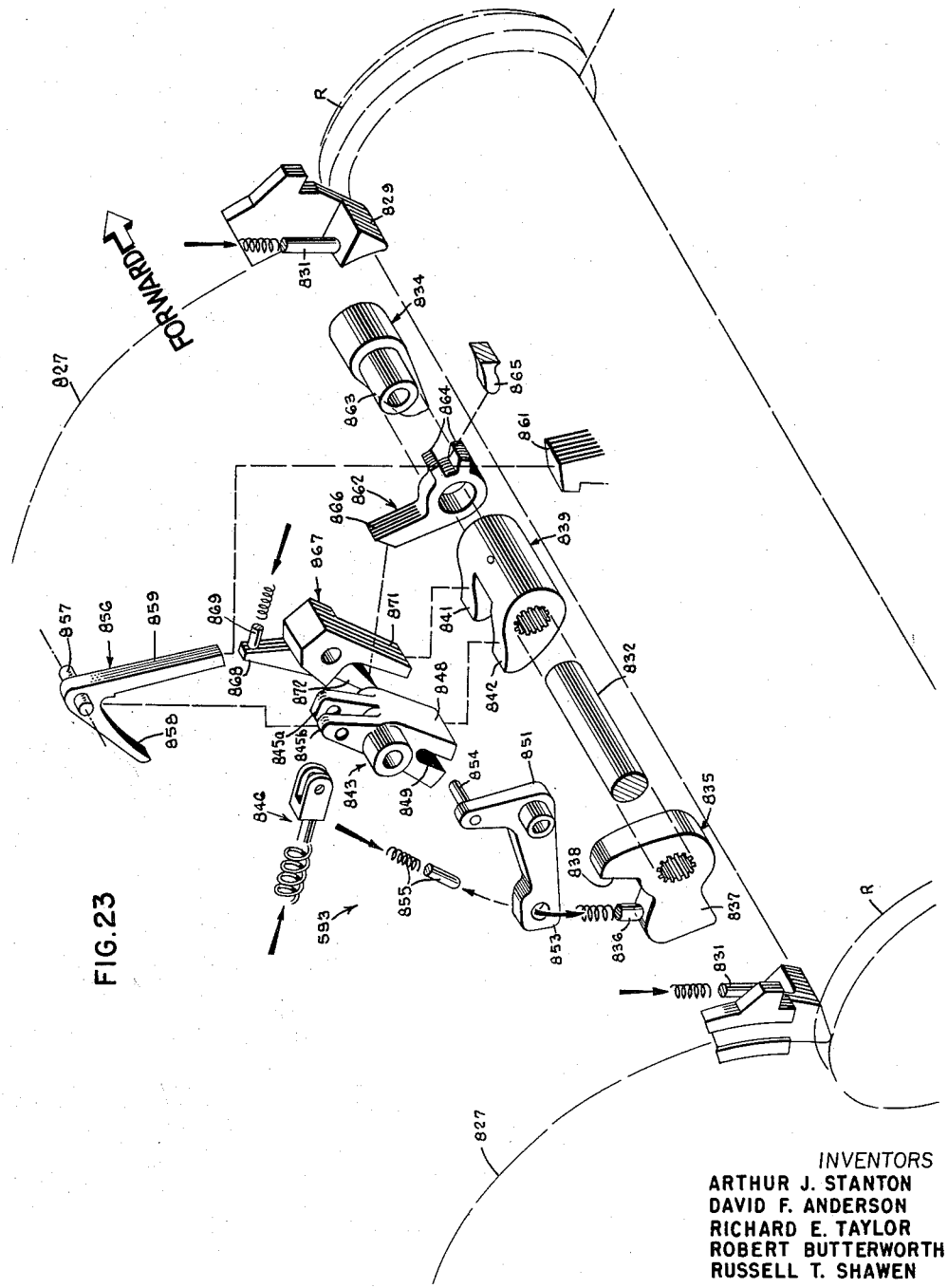

United States Patent Office 3,144,810
Patented Aug. 18, 1964

3,144,810
AUTOMATIC FEED AND CONTROL MECHANISM
Arthur J. Stanton, Bethesda, Md., David F. Anderson, McLean, Va., Richard E. Taylor, Hyattsville, and Robert Butterworth, District Heights, Md., and Russell T. Shawen, Arlington, Va., assignors to the United States of America as represented by the Secretary of the Navy
Filed June 3, 1957, Ser. No. 663,322
12 Claims. (Cl. 89—33)
(Granted under Title 35, U.S. Code (1952), sec. 266)

The invention described herein may be manufactured and used by or for the Government of the United States of America for governmental purposes without the payment of any royalties thereon or therefor.

This application discloses and claims an automatic ammunition feeding and control means for guns which is a portion of a complete gun system disclosed and claimed in copending application Serial No. 663,319, filed June 3, 1957, for Rapid Fire Gun System.

The present invention relates to an automatic ammunition feeding and control means for a low velocity, rapid fire gun mechanism. More particularly, this invention is directed to such means for a weapon suitable for a saturation zone type of protective or assault fire and which is especially well adapted for shipboard antiaircraft use.

Heretofore, antiaircraft guns of both large and small calibers have been devised for employment against high and low altitude attacking planes. Although the large caliber guns are effective at high altitudes when properly used, these guns are generally ineffective at low altitudes and short ranges because, among other reasons, of their slow rate of fire and the more effective evasive action taken by aircraft at low altitudes. Consequently, guns generally in use against low flying aircraft have been of a small caliber and in the machine gun class in order to obtain a rapid rate of fire and cope with the evasive action of aircraft attempting to avoid the zone of fire. However, the use of armor around the vital parts of aircraft has increased considerably and it has been found that the smaller caliber guns could make a number of hits without reaching a vital part, and, therefore, the attacking aircraft would, in many cases, continue the attack.

With conventional guns, as the caliber increases, the weight of the many gun components as well as the gun itself increases greatly. Heavier structural members are needed to load, transfer, and feed ammunition. The recoil forces generated require heavier mounting and driving structures. Consequently, aboardship the number of guns that can be installed is limited by the weight factor alone. Furthermore, the handling of conventional large caliber case ammunition presents problems because of its size and weight, such ammunition not being adapted to belt or clip type feeding as used in the machine gun class weapons.

The use of large guns and mounts generally prohibits the stowage of ammunition or maintenance of magazines on the same level on which the gun is mounted because of space requirements. Thus, the ammunition stowage is at a lower level, often employing three or more decks of the ship to contain all the necessary equipment. Location below decks complicates the problem of feeding ammunition to large caliber guns and necessitates the installation of elaborate ammunition hoists with associated large gains in overall weight and complexity of the ammunition handling equipment.

The present invention overcomes many of the disadvantages of the prior art weapons in that it provides an automatic, rapid feed, lightweight mechanism for feeding to a gun or other missile launching device a rocket assisted projectile of relatively large caliber and mechanism for controlling the feed thereof. The entire mechanism is relatively small and compact as compared with prior art mechanisms for similar caliber weapons and which are not capable of feeding in any given time interval an equivalent amount of large caliber ammunition as is handled by the present invention. This is true because of the novel arrangement of a large capacity magazine adjacent each gun which makes possible a high rate of automatic continuous fire for extended periods of time. The gun with which the present invention has been employed is provided with a rifled tube and fires a spin stabilized rocket propelled projectile. The projectile which is fed by the present invention is enclosed in a symmetrical container or case which functions both as a storage case and as an expendable gun chamber when the projectile is fired. The projectile is fired by the ignition of a reduced powder charge within the container and is propelled through the barrel at a relatively low velocity. While within the rifled gun barrel, the rocket propellent motor is ignited by the hot gases of the reduced powder charge and thereafter the projectile accelerates to a much higher velocity comparable to conventional projectiles during flight. Sufficient spin is imparted by the rifled tube of the launcher and canted nozzles of the spin stabilized rocket to make the rocket stable as it emerges from the tube. The canted nozzles of the rocket motor provide additional spin during flight. The recoil customarily present in the firing of relatively large caliber ammunition is substantially reduced because of the low firing pressures produced in the gun mechanism. The weight saved by the elimination of a gun receiver and the massive recoil and counterrecoil mechanisms permits extra ammunition to be carried on the mount. Machine gun rates-of-fire are obtained by the use of expendable gun chambers made feasible by the low powder pressure created when each round is fired. The employment of the expendable gun chambers makes possible the feeding of the rocket assisted ammunition laterally into axial alignment with the gun barrel without the necessity of axial ramming as is common with conventional cased ammunition.

It is, therefore, an object of the present invention to provide an automatic projectile feeding mechanism and control therefor capable of performing and controlling the feeding at a high cyclic rate, of large caliber rocket assisted projectiles to a gun or other missile launching apparatus.

Another object of the present invention resides in the provision of an automatic missile feeding assembly having a plurality of independent gas operated automatic mechanisms for the receiving of ammunition, and indexing the ammunition to a firing position.

An additional object is to provide an ammunition feeding means for rapidly moving in sequence a plurality of rounds from an associated transfer mechanism to a position in a gun in which the longitudinal axes of the projectile and gun barrel coincide and the ammunition is of the type having a projectile which is fired through the gun barrel by the sequential burning of case propellant and rocket propellant and is thereafter accelerated by the rocket propellant.

Another object of the present invention is to provide an automatic rapid feed mechanism and control therefor for feeding case enclosed projectiles to a firing station in a gun or other launching apparatus wherein the case is employed as a one-shot breech or an expendable gun chamber for the launching apparatus when the projectile is fired.

Yet another object is to provide an automatic gun mechanism having means for feeding and indexing rounds into and out of barrel alignment and including feed sprocket means driven and indexed by a reciprocable gas-operated slide.

A further object resides in the provision of an operating slide locking means operable while the gun is being charged and also when any unsafe firing condition exists.

Another object of the present invention resides in the provision of an operating slide for actuating associated devices which control the entry and exit of rounds to and from the firing position.

Another object is to provide a rocket launching system including a gun mechanism of relatively large caliber having a feeding mechanism that is readily removable and replaceable.

A further object of the instant invention is to provide a top cover for a gun mechanism, the cover containing a plurality of control pawls for controlling the entrance of rounds into the gun mechanism.

An additional object resides in the provision of a top cover for a gun mechanism, the cover being pivoted at the forward end thereof to facilitate servicing of a plurality of control mechanisms carried thereby.

Another object of the present invention is to provide a gun mechanism top cover which is rigidly and accurately secured in operating position but which may be quickly removed if so desired.

Still another object is to provide a gun mechanism top cover having guide rails for guiding rounds through the gun mechanism.

It is another purpose of this invention to provide an independent, readily removable mechanism with suitable interlocking devices for performing and controlling the rapid-rate feeding of ammunition to a firing station in a gun mechanism regardless of train and elevation of the gun.

Other objects and many of the attendant advantages of this invention will be readily appreciated as the same becomes better understood by reference to the following detailed description when considered in connection with the accompanying drawings wherein:

FIG. 6 is a side elevation view of the cradle, its trunnion support and the gun mechanism mounted in the cradle as viewed from the right-hand side thereof;

FIG. 7 is a rear perspective view of the gun mechanism with the top cover thereof raised, the backplate opened and the feed drive slide removed;

FIG. 8 is a top perspective view of the feed drive slide removed from the gun mechanism;

FIG. 9 is a bottom perspective view of the feed drive slide of FIG. 8;

FIG. 10 is a vertical longitudinal view partially in section and partially in elevation taken substantially on the center line of one of the gun mechanisms and illustrating the gun barrel, gas ports, sealing collar and the slide buffer cylinder;

FIG. 11 is a longitudinal view partially in section of the slide return spring, its housing and includes a diagrammatic showing of the gun charging apparatus;

FIG. 12 is a top plan view of the gun mechanism;

FIG. 13 is an enlarged sectional internal view of the backplate and the slide buffer springs shown at the left end of the gun mechanism shown in FIG. 12;

FIG. 14 is a perspective view taken from the right side of the top cover of the gun mechanism and showing the cover construction and the series of round control pawls mounted thereon;

FIG. 15 is a vertical sectional view through the top cover as viewed from a line substantially corresponding to line 15—15 of FIG. 14 and showing details of the rearward gate pawl;

FIG. 16 is a vertical sectional view through the cover taken on a line substantially corresponding to line 16—16 of FIG. 14 and illustrating the details of the forward round control guide;

FIG. 17 is a schematic view of the path of a round in normal feed passing from right to left from the round exit station of the transfer mechanism, through the gun mechanism and to an ejection station, and illustrating the various feed and control elements located in this area;

FIG. 18 is a changed position view of a portion of the structure illustrated in FIG. 17;

FIG. 19 illustrates a portion of the structure of FIG. 17 in a further changed position;

FIG. 20 is a schematic view of the path of succeeding rounds to a bypass mechanism should a hangfire or misfire occur;

FIGS. 21 and 22 are detailed sectional views showing the door of a bypass mechanism in a closed or pawl resetting position and open position, respectively; and FIG. 23 is an exploded schematic perspective view of the feed and control elements for controlling round entry into the gun mechanism.

*General Mount Description*

Figure 1:
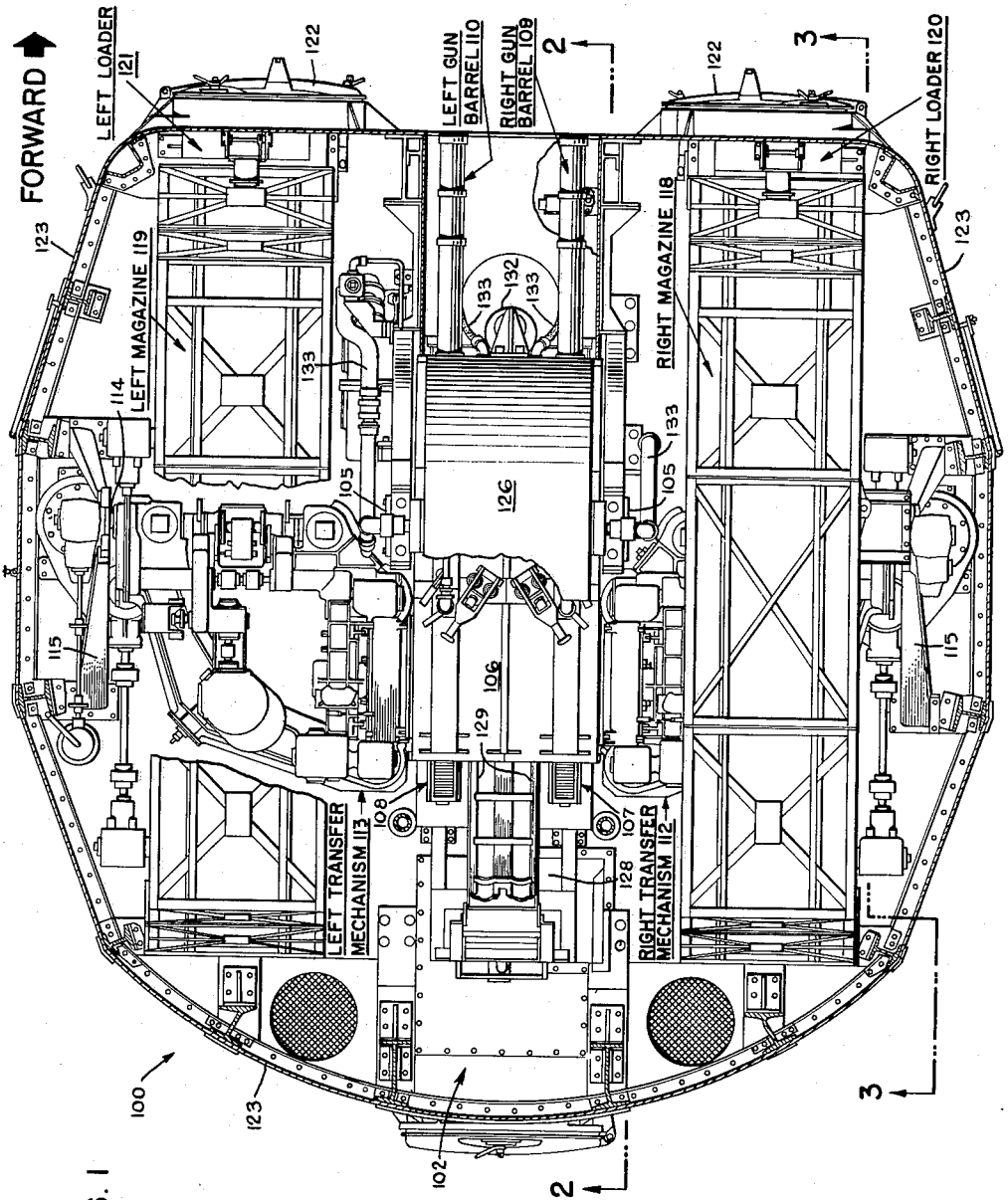
FIG. 1 is a top plan view with portions broken away of a twin mount embodying the present invention.

Referring first to FIGS. 1 through 5 which are general arrangement views of the entire system in which the present invention has been advantageously employed, it will be observed that a twin weapon mount, generally designated by numeral 100, is shown as mounted on a fixed stand 101 such as those which are presently in use on naval vessels. The mount comprises a platform carriage 102 which supports thereabove the gun and round handling mechanisms and carries therebeneath mount drive and power components forming no part of the present invention. The carriage 102 is rotatably supported for movement in train on roller bearings (not shown) which engage a mating roller path (not shown) formed in a fixed training circle gear 103. A carriage mounted drive pinion 104 is drivingly meshed with the training circle 103 for driving the mount in train. The additional power and associated equipment such as motors, firing cutouts, brakes, clutches and buffers, also carried beneath the carriage, form no part of the instant invention and will not be described in detail.

Figure 2:
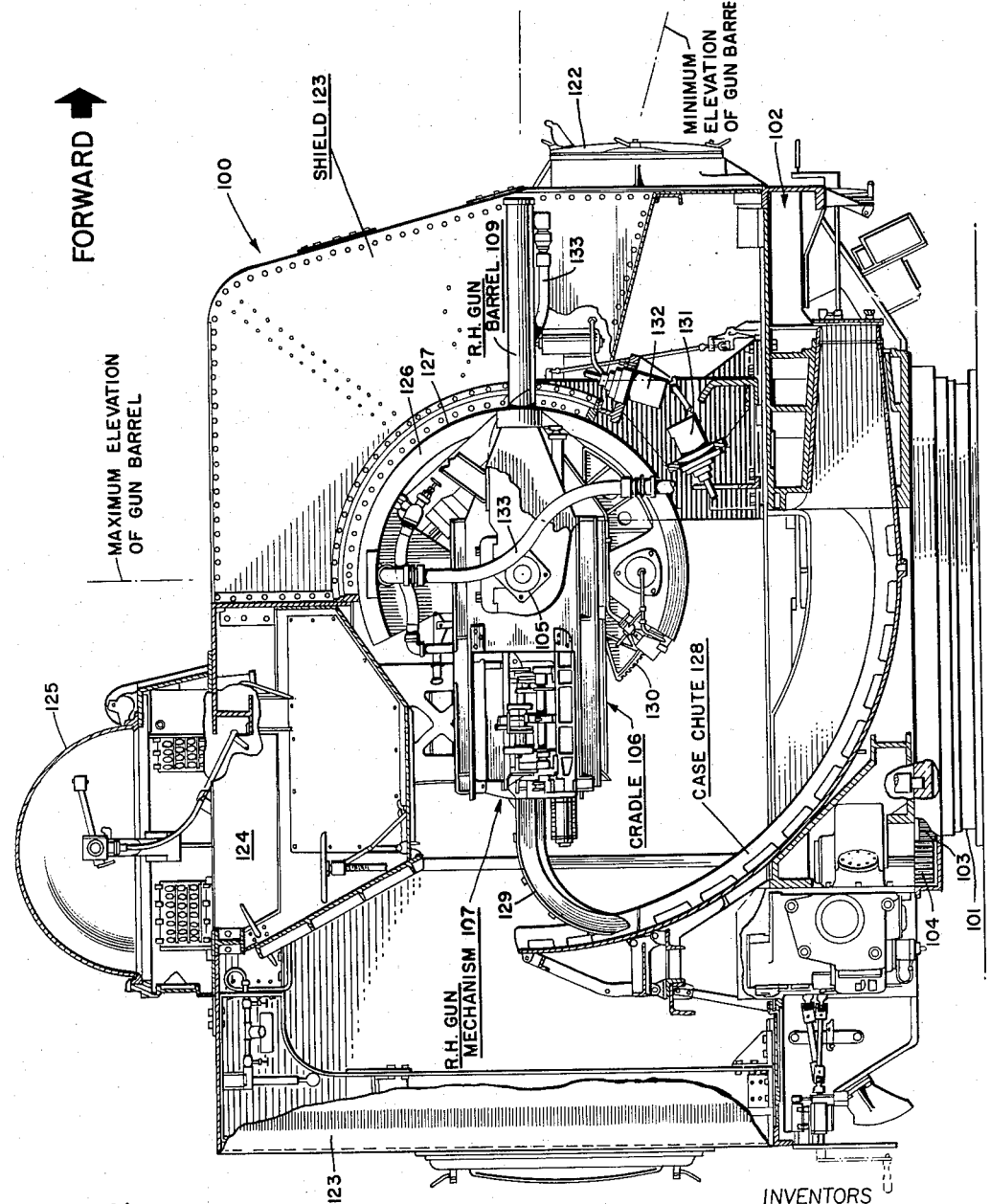
FIG. 2 is a vertical sectional view of the mount of FIG. 1 taken along a line substantially corresponding to line 2—2 of FIG. 1.
Figure 3:
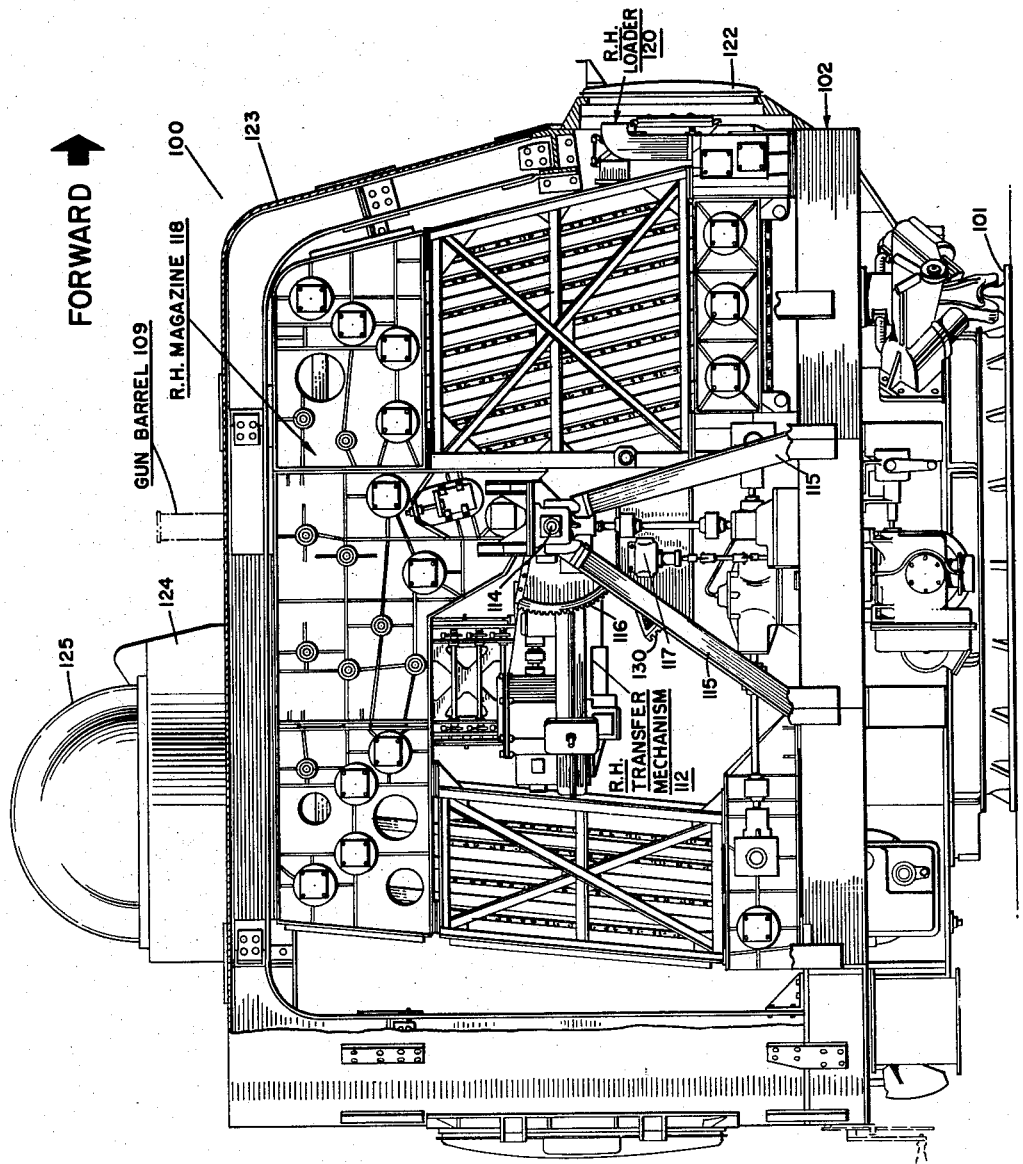
FIG. 3 is a vertical sectional view of the gun mount of FIG. 1 taken along a line substantially corresponding to line 3—3 of FIG. 1.
Figure 4:
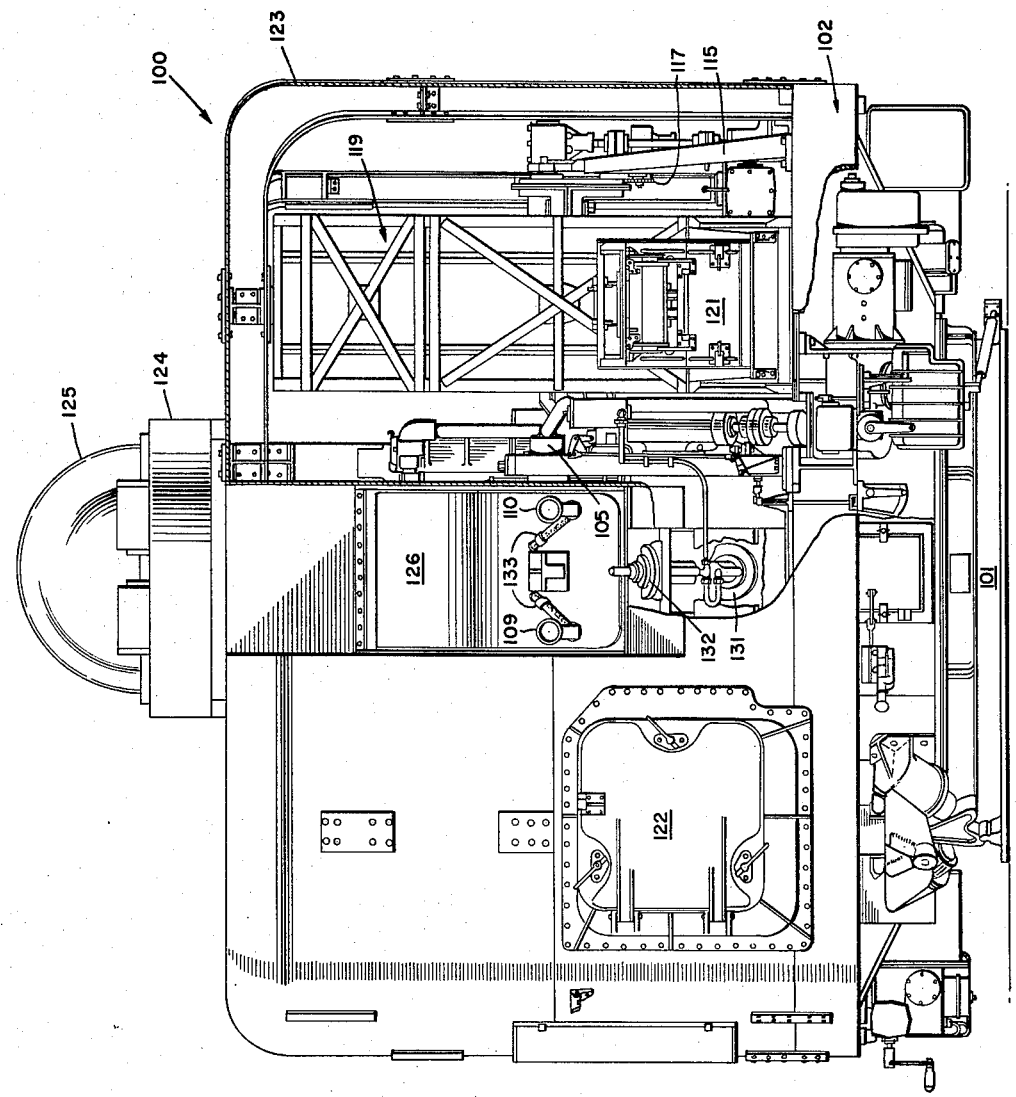
FIG. 4 is a front vertical elevational view of the gun mount of FIGS. 1, 2 and 3 with a portion of the shield broken away to better illustrate the relative locations of certain mechanisms of the system.
Figure 5:
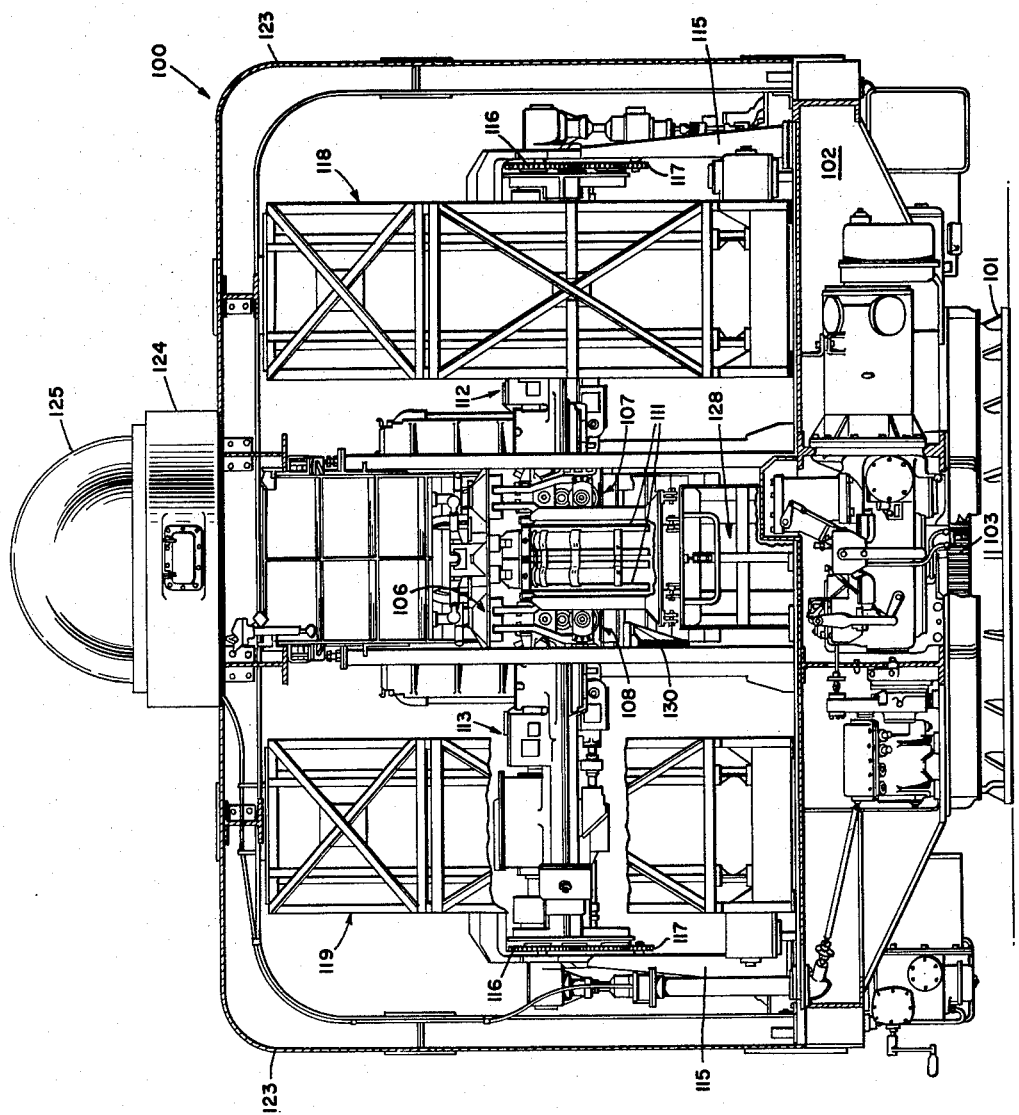
FIG. 5 is a rear vertical elevational view of the gun mount with portions of the shield and stand removed.

Located centrally atop the carriage is a pair of trunnion bearings 105 which support therebetween, an elevatable cradle 106. An elevating arc 130 is secured to the left-hand side of cradle 106, as viewed in FIG. 5, and is driven by a conventional elevating pinion (not shown) to move the entire cradle in elevation. An elevation stop buffer 131 and a depression stop buffer 132 are provided, as shown in FIGS. 2 and 4. The central portion of the cradle supports a pair of right and left-hand gun mechanisms 107 and 108, each mechanism having a rifled barrel 109 and 110, both respectively, protruding from the front portion of the cradle. A twin case ejection system 111 is also carried by the cradle and is located between the gun mechanism. Secured to opposite sides of the cradle and elevatable therewith, are right and left-hand round transfer mechanisms 112 and 113, respectively, the outer ends of which are supported in bearings 114 carried by similar right and left-hand pedestals 115 secured to the top of the carriage 102. An elevation response arc 116 is also secured to the outboard ends of each round transfer mechanism and is in contact with elevation response gearing 117 connected to suitable firing cutouts during adjustment of gun elevation. In addition, the elevation response gearing repositions certain elements in the transfer mechanism drive gearing to maintain alignment of feed star wheels at the round entry end of the transfer mechanism regardless of angle of gun elevation. This is accomplished by means of suitable differential gearing (not shown). Right and left-hand round storage magazines 118 and 119, respectively, are mounted outboard of the cradle on the carriage and overlie the major portion of the top surfaces of each round transfer mechanism. Right and left magazine loaders 120 and 121, respectively, are mounted on the forward and lower front end of each magazine through which rounds may be fed to the magazine to load endless round carrying chains (not shown) moving through each magazine. Access doors 122 permit access to the loader during periods of magazine loading and unloading.

A shield 123 secured to the carriage, completely encloses the mount units and forms a weather seal for the mount units and mount operator. The top central portion of the shield supports a control compartment 124 which includes a transparent observation dome 125 extending above the shield. A gun port shield 126 mates with a circular path 127 formed in the shield and may have inflatable waterproof sealing elements (not shown) for sealing the movable elements when in stowed condition.

A fixed case ejection chute 128, formed in the central floor portion of the carriage, is curved to conform with the sweeps of a pair of case deflector assemblies 129 carried by the afore-mentioned case ejection system 111 and delivers empty cases out of the front end of the mount. Suitable coolant lines 133 are employed to carry water to and from the gun cooling system.

*General Description of Gun Mechanism*

Referring now to FIGS. 6, 7, and 10, gun mechanism receiver 625 has a forward tubular barrel receiving portion 626, a flattened rear floor portion 627, a pivotable top cover 612 overlying the floor portion and forming a support for round engaging pawls 593. Thus pawls 593 and the floor 627 define a round entry door or gate, generally designated at 628 (FIG. 15). A rear, readily removable backplate 629 joins the floor and the cover. As best shown in FIG. 10, a barrel 109 is locked in the receiver by means of a retaining plate 631 engageable with a series of quick disconnect keys 632 formed on the gun barrel.

The flattened rear floor portion 627 lies between a pair of inner and outer integrally cast, longitudinally extending side rails 633 which are raised from the main floor portion 634 and support forward and rearward drive sprocket bearing supports 635 and 636, respectively.

Each of the bearing supports 635 and 636 is bolted at its base to the rails 633 of the receiver 625, and the top of each support is flattened to form forward and rearward lower round entry guide rails 637. Looking forward in FIG. 7, and as fully disclosed in application Serial No. 663,319, afore-mentioned, the rails have a reversed S-shaped configuration, the round entry rail ends 638 being on the same plane with the rounds feeding into the gun mechanism from the transfer mechanism 112. The round exit rail ends are raised to a height so as to place the moving round in axial alignment with gun barrel 109 and an adjacent ejection mechanism 111.

As shown in FIG. 7, located centrally and above the receiver main floor 634, a feed sprocket assembly 611 is rotatably mounted in and between the forward and rearward bearing supports 635 and 636, respectively. The feed sprocket assembly 611 comprises identical shaft-mounted forward and rearward, relatively thin, cross-shaped feed star wheels 641, and a thicker, centrally fixed drive star wheel 642 having four identical lobes, each lobe mounting a drive roller 643 at its outer end.

Now referring to FIGS. 8 and 9, located below the sprocket assembly 611 and in engagement with a pair of the drive rollers 643 is a feed sprocket operating slide 644, movable forwardly and rearwardly in slide guides 645 formed in the inner and outer side rails 633 of the floor portion of the receiver.

The upper surface of the slide 644 is generally concave to provide clearance for the feed star wheels 641 during the radial sweeps of the star wheels as forward and rearward motion of the slide is effected. Laterally extended lugs 646 are formed on the left and right sides of the slide and move in the slide guides 645, aforementioned. A switch engages a contact formed in a lug 646 on the forward right-hand side of slide 644 and serves to permit firing only when the slide 644 is in the full forward position as is more fully described in application Serial No. 663,319 aforementioned. The switch means may be electrically connected in any type firing circuit desired, one such circuit which has been employed advantageously is fully disclosed in the copending application identified in the preceding sentence. As viewed looking forwardly (FIG. 8), relatively straight left and right drive roller grooves 647 and 648, respectively, are provided on each upper and outer side of the slide in which two of the drive rollers 643 are engaged when the slide is in battery or counter battery. A central, elongated S-shaped, drive roller cam groove 649 communicates with the forward portion of the left roller groove 647 and the rearward portion of the right roller groove 648. This cam groove provides the means for converting straight line motion of slide 644 to rotary motion of feed sprocket 611. As the slide moves rearwardly in recoil, a drive roller 643 in the right groove 648 drops into a recessed portion 651 in the forward portion of that groove so that on forward motion of the slide, the right drive roller will then be displaced sideways leading the left drive roller into the curved path of the cam groove 649, thus rotating the feed sprocket in a counterclockwise direction. At the moment the left roller 643 begins to move laterally in the cam groove 649, the drive roller in the recessed portion 651 swings clear of the slide. Sprocket rotation is decelerated during the final 25 degrees of rotation of its 90 degree movement by means of a spring loaded, stepped cam 653, FIG. 12, situated adjacent the rear feed star wheel 641.

*Slide Forward Return Springs and Gun Charging*

Reference is now made to FIG. 11 wherein one of a pair of forwardly extending slide operating spring rods 681 is shown mounted on one side of the forward face of the operating slide. These rods move in a pair of similar spring housings 682 located below and adjacent the gun barrel housing 626 of the receiver. The rear end of each rod is secured as by threading 683 into the slide, the forward end having a forward spring receiving piston 684 secured thereto. Piston 684 maintains an expansion spring 685 in compression against a rear spring receiving cup 686 which abuts a shoulder 687 formed in the rear end of the spring housing. An additional piston 688 is used when it is desired to charge the gun, this piston being of a floating type, and located at the extreme forward end of the cylinder 682 and just clear of the forward spring piston 684 when the latter is in the full forward position. Any suitable pressure fluid medium may be introduced to the forward side of piston 688 by means of a central port 689 formed in end cap 691 which is threadably secured to the cylinder. This pressure is used to drive the operating slide rearwardly into sear latching position prior to initial firing.

In the embodiment shown, a pressure reservoir 692 is connected to the port 689 by means of pipe line 693. Located in the pipe line between the reservoir and the port is a two-way valve 694 of any suitable construction and controlled by a suitable solenoid L-6 connected to other circuitry of the system via switch 695 in any manner found convenient to achieve the desired results. For example, solenoid L-6 is shown as being actuated by means of switch 695 which may be in the mount control circuit if so desired. When closed, switch 695 energizes solenoid L-6 thereby causing valve 694 to open and port pressure fluid to the floating piston 688 to move the slide 644 to a rearward latched position. Once the slide is fully latched in the rearward position, a light (not shown) will signal this information and switch 695 will be opened. Solenoid L-6 is then deenergized and valve 694 will be opened to vent exhaust fluid from the cylinder 682. The slide is, at this time, conditioned for moving a round to the firing position. Subsequent feeding of ammunition from the transfer mechanism to the gun mechanism will initiate automatic operation.

*Forward Slide Buffer and Expansion Cylinder*

As a round is fired from the round container, a gas pressure is generated and is partially absorbed in a radial direction by the container which acts in the capacity of a breech. The remainder of the generated gas pressure is absorbed in a rearward direction by the backplate 629 which transmits the absorbed pressure to the cradle assembly 106 to which the backplate is attached. However, before the rocket projectile has passed the muzzle end of the gun barrel 109, a portion of this gas pressure is bled off rapidly into a buffer and expansion cylinder 701 (FIG. 10) which houses a piston assembly 702 normally in contact with the operating slide 644 and drives the slide rearwardly.

Referring particularly to FIG. 10, the buffer and expansion cylinder assembly 701 is centrally located in the forward part of receiver 625, below gun barrel 109 and has its center line substantially in line with the center of the forward end of the operating slide. The cylinder assembly 701 includes a rearwardly disposed gas expansion cylinder 704 and a forward fluid buffer cylinder 705 both threadably engaged by an intermediate piston rod connecting cylinder 706. An annular raised abutment 707 is formed on the outside wall and intermediate the ends of the expansion cylinder 704 for mating abutment with a cylindrical recess 708 formed in a vertical, rear wall 709 of the receiver. A similar abutment 711 is formed on the adjoining threaded rearward end of the connecting cylinder 706 and engages the forward surface of the receiver vertical wall 709. Thus, when these two parts 704 and 706 are threadably joined together, the entire cylinder assembly 701 is rigidly connected to the receiver wall. Reciprocably mounted in the expansion cylinder 704 is the gas driven piston assembly 702 having a piston 710 and rearwardly and forwardly extending shafts 712 and 713, respectively. The rear shaft 712 is supported by a suitable bearing surface 714 in the rearward end of cylinder 704, and the forward shaft 713 is likewise supported in the rearward end of connecting cylinder 706. Located forwardly of the piston is a gas entry port 715 in cylinder 704, the port 715 being aligned with port 716 formed in the receiver. Port 716 is in communication with the rearward end of the gun barrel interior via port 717 provided in gun barrel 109. Thus as the projectile passes port 717 in the barrel the gas pressure behind the projectile is vented to the forward face of the piston 710 which moves rearwardly thereby driving the operating slide rearwardly. An additional vent port 718 is provided for venting gas from expansion cylinder 704. This vent port 718 assists in venting the remaining pressure gas when the piston has been driven to the rearward end of the gas expansion cylinder and the fired rocket has emerged from the muzzle end of barrel 109.

The buffer cylinder 705 is provided with a piston operating chamber 719 at its rear end and a forward fluid expansion chamber 721 in communication with the operating chamber. An annular fluid bypass 722 is provided outside of and in communication with both chambers 719 and 721. A fluid reservoir 723 is located at the forward end of the buffer assembly 703. A spring 724 functions to return buffer piston 725 to its initial position as shown in FIG. 10. The piston operating chamber 719 contains the cup-shaped buffer piston 725 which is open at its forward face, the rear wall thereof having a series of apertures 726, each closed (in the piston forward stroke) by a movable ball 727, each ball being loosely retained by pins 728 which are mounted in the piston wall. The buffer piston 725 is integrally formed with a shaft having rearward and forward extensions 729 and 731, respectively. The rearward shaft 729 passes through and is supported by a rearward end wall 732 of the buffer cylinder where the shaft end engages the forward end of piston shaft 713.

The forward shaft 731, acting as a fluid throttle, is tapered downwardly from the piston to a point adjacent a fluid aperture 733 formed in the rear partition wall 734 of expansion chamber 721. Here, the shaft assumes constant diameter and enters a rear support wall 735 of the reservoir chamber 723. The expansion chamber 721 is provided with a series of radially located ports 736 formed in the forward outer wall thereof. Ports 736 communicate with the annular bypass 722 which, in turn, communicates with a series of additional ports 737 located adjusted the rear wall of piston 725.

A spring retaining tube 738, integral with a forward end plate 739 of the reservoir 723, extends rearwardly and is supported at the rearward wall 735 of the reservoir. The tube 738 carries the compression spring 724 which urges the buffer piston shaft 731 rearwardly. Fluid pressure from the expansion chamber 719 may be further diverted into the reservoir by means of a series of angular passages 741 formed in the rear reservoir wall 735. Fluid is maintained at a predetermined pressure by means of additional spring-biased piston 742 in the reservoir forward end. The end plate 739, in addition to closing the end of the reservoir, carries conventional means 743 for pressurizing reservoir 723.

The function of the buffer cylinder 705 will now be described. Forward motion of slide 644 causes the slide to first strike the outwardly extended rear shaft 712 of the gas expansion piston 710, this shock being directly transmitted forwardly to the buffer piston 725. Forward motion of the buffer piston urges fluid in the operating chamber 719 to flow through the restricted orifice 733 and expand outwardly through the forward radial ports 736 of the expansion chamber 721. The fluid will then be ported through the bypass 722 to the ports 737 now behind piston 725 to transfer fluid to the other side of the piston. This occurs when piston motion has ceased by reason of fluid pressure build-up in chamber 719 in front of piston 725 during forward stroke. Balls 727 will move forwardly off their seats when spring 724 causes the piston 725 to be returned to its initial position as shown in FIG. 10. This unseating of balls 727 provides a path of flow through apertures 726 as well as through bypass 722 and permits a rapid return of the piston to its initial position.

*Rear Slide Buffer*

A general description of this portion of the gun mechanism will be helpful before proceeding to the detailed description thereof. In the normal cycle of firing, the operating slide is gas driven rearwardly, is buffered at its rearmost point of travel and is then moved forwardly by spring tension where it is buffered on its forward stroke and the cycle repeated.

Referring now to FIGS. 7, 12 and 13, the backplate 629 functions as part of the gun mechanism and also serves to lock the rear floor portion 627 of the receiver 625 to the rear upper and lower gun receiving portions 743 and 744, respectively, of the cradle assembly. The backplate is pivotally secured at each of its lower sides to the floor of the receiver by means of vertical pins 745 passing through bifurcated horizontally extending hinge ears 746 on the backplate. Hinge ears 746 receive cooperating extending single ears 747 integral with the rear floor of the receiver. The upper end of the backplate is formed with a pair of vertically extending ears 748 that are received by depending ears 749 formed on the upper part of the cradle and is secured by a pin 751 extending transversely therethrough. Top cover receiving and gripping slots 752 are formed on the sides of the backplate near the upper end thereof to align with suitable rear cover extensions 753 and secure the cover 612 at its rearmost and end against lateral and vertical displacement. A firing pin 679, centrally located in the backplate is axially aligned with the gun barrel and used to electrically fire the primer in the closed end of the round container.

Referring particularly to FIG. 13, a slide buffer 754 is provided at the lower rear face of the backplate and comprises a hollow, cylindrical U-shaped spring support 755 rigidly secured to the backplate, the support enclosing a stacked series of dished spring washers 756 centrally bored to receive a sear supporting shaft 757 which passes therethrough. The front face of the backplate is transversely slotted at 758 to receive an outwardly displaced forward slide buffer plate 759. Plate 759 is centrally bored to receive and support the forward end of the sear supporting shaft 757. The ends of the plate 759 support a pair of shouldered bolts 761 which pass through openings 762 formed in the backplate on each side of the sear supporting shaft 757, the ends of the bolts contacting a spring engaging rear buffer plate 763 to transmit the rearward shock of the operating slide striking the plate 759 to the springs 756.

Referring particularly to FIGS. 7, 12 and 13, a sear mechansim 764, carried by a sear mounting block 765 is integrally formed with the forward end of the sear supporting shaft 757, the rear end of shaft 757 being threaded to receive a shaft supporting and adjusting nut 766 rotatably carried by the rear wall 767 of the spring support 755. A hollow cylindrical bushing 768, carried on support shaft 755, is interposed between the nut 766 and the rear buffer plate 763 and is used to support and prevent deflection of the stacked spring washers 756. Deflection of the sear mounting block 765 is minimized by constant contact of the upper surface of the block with a lower surface 769 of the rear sprocket support 636 and intermittent contact of a pair of outwardly extending shoulders 771 formed on the sear mounting block which mate with recesses 772 formed in the slide 644.

Gun Mechanism Top Cover

Turning now to the description of FIGS. 7 and 14, the top cover 612 is an elongate structure pivoted at 825 by means of a pair of ears 826 formed on its forward end to receiver 625 adjacent the barrel receiving portion.

As afore-mentioned, the rear end of the cover has two lug-like rearward extensions 753 that are engaged by recesses 752 formed on the upper sides of the backplate 629. Thus once in place, the cover is rigidly held and accurately spaced above drive sprocket 611 and associated round guide rails 637, also previously described.

Forward and rearward upper guide rails 827 are formed on the undersurface of the cover and are curved in parallel spaced relationship with the lower rails 637 formed on the forward and rearward sprocket bearing supports 635 and 636, respectively, so as to guide a round therebetween. As viewed looking forward in FIG. 17, the configuration of the rails and that of a section through the cover is substantially flat and horizontally extends over the sprocket 611, and the round entry side is curved downwardly and supports a series of round engaging pawls and latches 593 to be now described in detail.

Mounted inboard of each guide rail 827 in vertical depending end flanges 828 are a pair of forward and rearward similar round control guides 829, each being vertically movable and spring-biased downwardly by similar spring plungers 831. These control guides move upwardly upon contact with an incoming round and serve only to assure longitudinal alignment and retention of the round as it enters feed sprocket 611.

Referring now to FIGS. 14 through 23, a gate pawl shaft 832 is rotatably journaled in a series of vertical downward extensions 833 of the cover and are located intermediate the round control guides 829. This shaft 832 carries forward and rearward gate pawls 834 and 835, respectively, secured to the shaft at each end.

Rearward gate pawl 835 is spring urged downwardly into the path of an incoming round by means of a vertically disposed spring plunger 836 bearing on the round engaging portion 837 of pawl 835. Vertically extending stop portion 838 of pawl 835 contacts the cover and serves as a rotational limit stop for shaft 832. The forward gate pawl 834 functions in the same manner as the rearward pawl 835 with the exception that no limit stop is required on the forward pawl, the stop portion 838 on the rearward pawl functioning for both pawls.

Mounted centrally between the two gate pawls 834 and 835 and rigidly secured to pawl shaft 832 is a gate pawl shaft motion limit pawl 839 having laterally extending forward and rearward ears 841 and 842, respectively. The function of pawl 839 is to prevent the gate pawls 834 and 835 from rotating at certain times and thus prevent round entry into the gun mechanism. In the normal feeding of a round (FIG. 17) from position B to position C, it is desired to prevent the next succeeding round at position A from entering position B until the preceding round has fully cleared position B so that the latter position is ready to receive a new round. As a general statement, it is apparent that if the motion limit pawl 839 is prevented from rotating, the two gate pawls 834 and 835 will not rotate and will be in the proper position to prevent round entry.

In reference to the above general statement, the means to lock and unlock the pawl shaft 832 will be now described in detail. There are provided primary and secondary motion limit pawl locks. The primary motion limit pawl lock 843 which interacts with limit pawl 839, is rotatably mounted on a longitudinally extending shaft 844 carried by cover 612, this shaft being located above and interiorally of pawl shaft 832. The pawl lock 843 has a pair of upwardly extending ears 845a and 845b. Pivotally secured to ear 845a is a pressure spring assembly 846, the opposite end of spring 846 engaging a bracket 847 mounted on the top of cover 612. The pawl lock 843 also has a downwardly extending portion 848 which includes slot 849. The downwardly extending portion 848 engages ear 842 of limit pawl 839. A lock operating bell crank arm 851 is rotatably secured on a stub shaft 852 carried by one of the extensions 833, previously mentioned, of the cover 612. The lower end of crank arm 851 is formed with a round engaging finger 853 which lies in the path of rounds traveling from position B to position C (FIG. 17). The upper end of crank arm 851 carries a pin 854 which engages the walls of slot 849 in pawl lock 843. Thus motion of crank arm 851 is transmitted to pawl lock 843 via pin 854. As crank arm 851 is moved a short distance upwardly by an incoming round approaching position B, the spring assembly 846 is further compressed and exerts a resistance via pawl lock 843 to crank arm 851 and thereby maintains the crank arm in engagement with the round. This arrangement also functions to return the crank arm to its initial position when the round has moved to position C. Upon further upward movement of arm 851 as the round moves into position C an additional accelerator spring plunger 855, mounted in the cover 612, comes into play and bears directly upon the outermost end of the round engaging finger 853. This additional spring plunger 855 is used for the purpose of accelerating the return of crank arm 851 when the latter is in its uppermost position. While crank arm 851 is being moved upwardly by the incoming round, the arm moves pawl lock 843 into a position where the portion 848 overlies the rearward ear 842 of limit pawl 839 thereby stopping upward movement of the two gate pawls 834 and 835, FIG. 19. Consequently, in normal feeding operation, no rounds may advance from position A to position B while the sprocket 611 feeds a round from position B to position C.

The structure of the locking mechanism for the door of the bypass and lifter assembly disclosed in copending application Serial No. 663,317, filed June 3, 1957, for Ammunition Transfer Mechanism will now be described. Each time the gate pawls 834 and 835 permit round entry so that rounds pass from position A to position B by pressure of succeeding rounds from the transfer mechanism, it is desired to have the bypass door 568 locked in the down position, as illustrated in FIG. 17. If a round is in transit from position B to position C and the gate pawls 834 and 835 are locked, it is then desired to allow the bypass door 568 to open. Therefore, the top cover 612 also carries a positive door lock 856. This positive door lock includes a bell crank pivotally carried by stub shaft 857 mounted on the extreme top of the cover. A cam end 858 on the bell crank overlies and is actuated by the upper end of the ear 845b of pawl lock 843. The door lock is also provided with depending arm 859 which engages a stop block 861 mounted on the front and top end of bypass door 568.

The operation of the door lock 856 will now be described with reference to FIGS. 17, 18 and 19. As a round approaches the end of the round path from position A to position B, finger 853 moves clockwise rotating pawl lock 843 in the opposite direction, causing cam end 858 of door lock 856 to move upwardly and in a clockwise direction to thereby move arm 859 out of engagement with the door mounted stop block 861.

Once the round has passed from position B to position C, the door lock 856 is automatically reset by a reverse action of the foregoing operations.

In the event of a delay in firing, as would be caused by a misfire or hangfire, for example, a secondary lock and release arm actuated by the opening and closing of the bypass door is provided. Describing the function of this mechanism briefly before proceeding to the detailed description thereof,: it will be apparent that in the event the door does open, it will be necessary to block rounds from entering the feed sprocket 611. Therefore, the same forward and rearward gate pawls 834 and 835 are utilized along with the shaft motion limit pawl 839, all afore-mentioned. Briefly, upward movement of the door 568 will rotate a release arm, the arm in turn causing a spring-biased lock, normally in unlocked position, to overlie one of the ear portions 841 of the motion limit pawl 839 thereby locking the two gate pawls 834 and 835 against rotation.

Proceeding now ot the detailed description of the secondary latch means or door locking mechanism, a secondary pawl lock release arm 862 is independently operable and rotatably secured to a longitudinally extending boss 863 formed on gate pawl 834. This release arm 862 is located adjacent to and forward of the limit pawl 839. The outer face of the release arm is bifurcated to form a recess 864 for receiving an actuator lug 865 which rotates release arm 862 counterclockwise for a purpose to be explained hereinafter. The opposite end 866 of release arm 862 is extended laterally and inwardly to engage a secondary motion limit pawl lock or latch member 867. The pawl lock 867 is also independently operable and rotatably mounted on shaft 844 adjacent and forwardly of the primary pawl lock 843 and has an upstanding end 868 in engagement with a spring urged plunger 869 mounted in cover 612. The opposite end of secondary pawl lock 867 has a downwardly extending pair of lugs. One of the lugs is a lock lug 871 that overlies ear 841 of limit pawl 839 when the latter is in its locked position. The other lug is a control lug 872 which is engaged by end 866 of release arm 862 when the secondary pawl lock is in its cocked or unlocked position, as best illustrated in FIG. 21. Thus, when rounds stop feeding due to a misfire or other delay, round stoppage occurs under the bypass door 568 and succeeding rounds exert sufficient pressure against this round to cause the door actuator lug 865 to rotate the release arm 862 in a counterclockwise direction (looking forward in FIG. 22). The end of the release arm now will ride down the inner surface of control lug 872 and lock lug 871 will move in a counterclockwise direction by action of spring plunger 869 to bear against ear 841 of motion limit pawl 839 to lock the gate pawls 834 and 835 in the downward position to prevent further round entry into the gun mechanism. When the gun has been cleared for firing, the bypass door is manually relatched and this will then reset the release arm 862 into holding engagement with the secondary motion limit pawl lock 867. From the foregoing, it will be apparent that primary and secondary round entry locking systems, each independent from the other, have been provided for normal and interrupted feeding cycles.

Summary or Operation

The operation of the portions of the gun mechanism 107 which comprise the present invention will be summarized briefly at this point and in greater detail hereinbelow. After the transfer mechanism 112 has delivered a round to the entry side of the gun mechanism, the round is urged beyond the round engaging pawls 593 by forward pressure exerted by the next succeeding round if the round is properly positioned and the preceding round has fired. The round engaging pawls 593, mounted on the top cover 612 of the gun mechanism, restrain the round or permit the round to enter the gun mechanism depending on whether or not the proper firing conditions exist.

The gun is charged by the action of piston 688 which is driven by any suitable pressure fluid to move the operating slide rearwardly into its seared or latched position prior to initial firing of the gun. When the slide is in its seared or latched position, it is in a condition for moving a round to the firing position. When the side is released it will be driven forwardly to rotate feed sprocket 611 and move a round to the firing position and subsequent feeding and firing of ammunition will initiate automatic operation. After the round enters the gun mechanism, it is moved upwardly and laterally along rails 827 and 637 into alignment with the gun barrel 109 by feed sprocket 611. The round is fired from the container into and through the barrel, the firing charges igniting the propellant which, in turn, accelerates the projectile to high velocity. The gun slide 644 is moved rearwardly by means of the buffer and expansion cylinder 701 which receives recoil pressure through ports 717, 716, and 715. The slide return springs 685 are compressed by the slide as it travels rearwardly under the action of the recoil pressure gases. The slide is latched or seared slightly forward of its rearmost position by sear mechanism 764 if proper firing conditions do not exist at this time. The sear mechanism 764 is released by subsequent incoming rounds which are admitted only if proper firing conditions exist, that is, if the next succeeding incoming round is in the correct feeding position and the previous round has properly fired. This next round actuates mechanism such as that disclosed in copending application Serial No. 663,318, filed June 3, 1957, for Sear and Trigger Mechanism which permits the slide to be driven forward by springs 685. The feed sprocket 611 is rotated by cam surface 649 on the slide as the latter moves forward to thereby move the next round into firing position. Thus, automatic feed and fire will continue so long as the firing switch in a suitable firing circuit remains closed and the rounds continue to fire and feed properly. Feed sprocket 611 also functions to move the empty round case of each round, immediately after the round is fired, out of the gun mechanism 107 and into the case ejection system 111.

Now summarizing the operation of the gun mechanism in greater detail, the cam groove 649 in the gun slide 644 converts the straight-line motion of the slide to rotary feed sprocket motion for the feeding of rounds to the gun mechanism by feed sprocket assembly 611. As the slide moves rearwardly in recoil, drive roller 643 on sprocket 611 travels through the right roller cam groove 648 and drops into the recessed portion 651 in the forward portion of that groove so that on the forward motion of the slide, the right drive roller will then be displaced sideways thereby leading the left drive roller into the curved path of the cam groove 649 to thereby rotate feed sprocket 611 in a counterclockwise direction, as viewed in the forward direction. At the moment the left roller 643 begins to move laterally in the cam groove 649, the right roller in the recessed portion 631 swings clear of the slide. The spring loaded, step cam 653 which is positioned adjacent the rear feed star wheel 641 functions to decelerate feed sprocket rotation during the final 25° of its 90° rotational movement to thereby decelerate movement of the round and bring it to a standstill in the firing position in longitudinal alignment with the barrel of the gun mechanism.

When a round is fired from its round container and the rocket projectile has passed a sufficient distance through the gun barrel 109, the major portion of the generated gas pressure behind the projectile is bled off to the buffer and expansion cylinder assembly 701 to act upon piston assembly 702 and thereby drive the slide 644 rearwardly. The pair of springs 685 function to decrease the backward motion of the slide and urge the slide forwardly in its drive stroke to rotate feed sprocket 611. The forward momentum of the slide is absorbed, to a large extent, by buffer assembly 703.

During its forward motion the slide 644 first strikes the outwardly extending rear shaft 712 (FIG. 10) of the gas expansion piston 710, this shock being directly transmitted forwardly to the buffer piston 725. Forward motion of the buffer piston urges fluid in the operating chamber 719 to flow through the restricted orifice 733 and expand outwardly through forward radial ports 736 of the expansion chamber 721. The pressure fluid on one side of the piston 725 is transferred to the other side of the piston by being ported through the bypass 722 to the ports 737 which are now behind the piston 725. When spring 724 causes the piston 725 to be returned to its initial position shown in FIG. 10, balls 727 will move forwardly off their seats to provide a path of flow through aperture 726 as well as through bypass 722 thereby providing a rapid return of the piston to its initial position.

Thus, it will be seen that in the normal cycle of firing, the operating slide is gas driven rearwardly, is buffered at its rearmost point of travel and is then moved forwardly by spring compression to a forwardmost position where it is buffered and the cycle is then repeated.

However, upon the occurrence of an unusual condition, the normal firing cycle will be interrupted, the operating slide remaining in a latched or seared position slightly forward of its rearward limit of travel. For example, to charge the gun and initiate automatic firing after loaded rounds have been moved to the round exit of the transfer mechanism, the operating slide in moved rearwardly by pressurized fluid from reservoir 692 acting against the forward face of piston 688 when switch 695 is closed. The operating slide is latched by a suitable sear mechanism, and only when rounds have been advanced by the transfer mechanism into a triggering position in the gun will the sear be released to allow the slide to move forwardly and laterally displace a round into the firing position. Another condition under which the slide is seared is when the rounds are bypassed prior to reaching the trigger position. For example, when a cessively moving rounds into and out of barrel alignment, hangfire occurs, the delay in firing will cause an accumulation of rounds in the vicinity of the ammunition bypass door 568 which operates the bypass mechanism. When the hangfired round finally fires, the slide will be driven rearwardly and latched in its seared position and will remain seared until a round entering the gun mechanism releases the sear mechanism. In the event of a misfire, the cycle will be the same as in charging the gun when it is desired to initially effect firing operations.

The round control guides 829 (FIGS. 7, 14 and 23) move upwardly upon contact with an incoming round and function to longitudinally align and retain the round as it enters feed sprockets 611.

During normal feeding of a round (FIGS. 17, 18 and 19) from position B to position C, it is desired to prevent the next succeeding round at position A from entering position B until the preceding round has fully cleared position B. Toward this end pawl 839 functions to prevent gate pawls 834 and 835 from rotating during presence of a round at position B thereby preventing round entry into the gun mechanism. As the crank arm 851 is moved a short distance upwardly by an incoming round approaching position B, the spring assembly 846 is further compressed and exerts a resistance by pawl lock 843 to crank arm 851 and thereby maintains the crank arm in engagement with the round. This arrangement also functions to return the crank arm to its initial position when the round has moved to position C. Spring plunger 855 bears upon the outermost end of the round engaging finger 853 when the round moves into position C, arm 851 being moved in an upward direction by the incoming round. While crank arm 851 is being moved upwardly by the incoming round, the arm moves pawl lock 843 to a position overlying the rearward ear 842 of limit pawl 839 thereby preventing upward movement of the gate pawls 834 and 835.

As the round approaches the end of the round path from position A to position B, finger 853 moves clockwise to rotate pawl lock 843 in the opposite direction, causing cam end 858 of the bypass door lock 856 to move upwardly and in a clockwise direction to thereby move arm 859 out of engagement with the bypass door mounted stop lock 861.

Door lock 856 is automatically reset by a reverse action of the foregoing operations once the round has passed from position B to position C.

The secondary bypass door lock and release arm 862 is actuated by the opening and closing of the bypass door in the event of a delay in firing as would be caused by a misfire or hangfire. When the bypass door opens, it is necessary that rounds be blocked from entering the feed sprocket 611, and the forward and rearward gate pawls 834 and 835 are utilized together with the shaft motion limit pawl 839 to block the incoming rounds. The upward movement of door 568 rotates the secondary pawl lock release arm 862, which causes a spring-biased lock lug 871, normally in unlocked position, to overlie one of the ear portions 841 of the motion limit pawl 839 thereby locking the two gate pawls 834 and 835 against rotation.

As accumulation of rounds occurring in the vicinity of the bypass door 568, as when there is a misfire or other delay in firing, exerts an upward force against the door sufficient for the gate pawl actuator lug 865 to rotate the release arm 862 in a counterclockwise direction (looking forward in FIG. 22). The end 866 of the release arm now will ride down the inner surface of control lug 872 and lock lug 871 will move in a counterclockwise direction by action of spring plunger 869 to bear against the ear 841 of the motion limit pawl 839 to lock the gate pawls 834 and 835 in the downward position thus preventing further round entry into the gun mechanism. When the gun has been cleared for firing, the bypass door is manually relatched, which operation resets the release arm 862 in holding engagement with the secondary motion limit pawl lock 867.

Obviously many modifications and variations of the present invention are possible in the light of the above teachings. It is therefore to be understood that within the scope of the appended claims the invention may be practiced otherwise than as specifically described.

What is claimed is:

1. In a gun mechanism having a round entry station, a round firing station, and a round exit station, the combination of a rotary feed means mounted adjacent said round entry station, means for guiding successive rounds in their movement from said entry station to said exit station, drive means connected to said rotary feed means for causing the feed means to advance successive rounds from said entry station to said firing station thence to said exit station during sequential movement of said drive means, and feed control means for stopping or permitting rounds to move through the gun mechanism during movement of rounds through said entry station.

2. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, round entry gate means disposed between said continuous feeder and said gun barrel, support means for said gate means, and lock means for said gate means and operable during indexing movement of said feed means, and round bypass locking means alternately actuated by the positioning of said lock means for said gate means.

3. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a yieldable round entry gate means positioned adjacent the round entry end of said receiver, support means for said gate means including a cover positioned over said receiver, and lock means carried by said cover for sequentially locking and unlocking said gate means.

4. In an automatic firearm having a barrel, receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a rotatable shaft, means for supporting said shaft adjacent the round entry end of said receiver, a plurality of round restraining pawls connected to said shaft, a lamit pawl secured to said shaft and rotatable with said pawls, a pawl lock for sequentially engaging said limit pawl for causing stoppage of round feeding through said round entry end and means for actuating said pawl lock during operation of said feed means.

5. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a round entry gate mounted at one end of the round passage, and means for releasing the latch on the movable bypass door when the round entry gate becomes latched in the closed position.

6. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a cover overlying said receiver, guide rails formed in said cover for controlling the direction of round movement through said receiver, a round entry gate carried by said cover and including a rotatable shaft, a series of pawls connected to said shaft and aligned for opposition to round entry into the receiver when the gate is closed, a pivotally mounted lock for sequentially engaging one of said pawls, an operating arm for said lock actuated during round passage, and means linking said operating arm to said lock.

7. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a rotatable shaft, means for supporting said shaft adjacent the round entry end of said receiver, a plurality of round restraining pawls connected to said shaft for movement into and away from a round restraining position in accordance with the rotational position of said shaft, a limit pawl secured to said shaft and rotatable with said pawls, latch means for sequentially engaging said limit pawl for causing stoppage of round feeding through said round entry end, the rounds being forced through said bypass door when said pawls are in a round restraining position, and linkage means connecting the door to said latch means for effecting latching and unlatching of said door during operation of said round restraining pawls.

8. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a rotary member, means for supporting said rotary member in the receiver, round engaging means secured to said rotary member, a sprocket having a plurality of radially extending arms secured to and rotatable with said rotary member, and contact means carried by said extending arms for frictional engagement with said drive means.

9. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a rotatable member, a plurality of pawls connected to said rotatable member for permitting rounds to pass through said receiver when in a first position and preventing rounds from passing therethrough when in a second position, resilient means for biasing said pawls into said second position, limit means connected to said rotatable member for limiting the rotational movement of the latter, support means for said rotatable member, and lock means for said rotatable member and operable during indexing movement of said feed means, and round bypass locking means alternately actuated by the positioning of said lock means for said rotatable member.

10. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a round entry gate means disposed between said continuous feeder and said gun barrel, support means for said gate means, lock means for said gate means and operable during indexing movement of said feed means, latch means for sequentially engaging the door, said latch means being actuated by the positioning of said lock means for permitting a change in the direction of round travel when said gate means is locked.

11. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a movable round entry gate means disposed between said continuous feeder and said gun barrel, support means for said gate means, a lock member pivotally supported adjacent said gate means and engageable therewith, a pivoted actuator arm having one end disposed in contacting engagement with rounds passing thereby and the opposite end in frictional contact with said lock member, and round bypass locking means alternately actuated by the positioning of said lock member for said round entry gate means.

12. In an automatic firearm having a barrel, a receiver having a round entry end and a round exit end, a continuous feeder for moving rounds adjacent the receiver, the continuous feeder defining a round passage, a movable round bypass door adjacent the receiver and normally in a closed position, a latch for said bypass door, and a gun mechanism comprising; rotatable feed means for successively moving rounds into and out of barrel alignment, reciprocating drive means operable for actuating said feed means when a round is fired, a rotatable shaft, means for supporting said shaft adjacent the round entry end of said receiver, a plurality of round restraining pawls connected to said shaft for movement into and away from a round restraining position in accordance with the rotational position of said shaft, a limit pawl secured to said shaft and rotatable with said pawls, a latch member pivotally supported adjacent said limit pawl, said latch member having a plurality of lugs, one of said lugs being a lock lug and sequentially engageable with said limit pawl, resilient means biasing said latch member to a latched position, an upstanding end on said latch member engaging said resilient means, a bypass door lock and release arm, the second of said lugs being a control lug having an inclined face frictionally engaged by said lock and release arm for effecting locking movements of said latch member between latched and unlatched positions, the rounds being forced through said bypass door when said pawls are in a round restraining position, and linkage means connecting the door to said latch means for effecting latching and unlatching of said door during operation of said round restraining pawls.

References Cited in the file of this patent
UNITED STATES PATENTS

| | | |
|---|---|---|
| 2,779,248 | Stevens | Jan. 29, 1957 |
| 2,800,056 | Atherton | July 23, 1957 |

UNITED STATES PATENT OFFICE
CERTIFICATE OF CORRECTION

Patent No. 3,144,810

August 18, 1964

Arthur J. Stanton et al.

It is hereby certified that error appears in the above numbered patent requiring correction and that the said Letters Patent should read as corrected below.

Column 15, line 75, strike out "suc-" and insert -- successively moving rounds into and out of barrel alignment, --.

Signed and sealed this 20th day of April 1965.

(SEAL)
Attest:

ERNEST W. SWIDER
Attesting Officer

EDWARD J. BRENNER
Commissioner of Patents